United States Patent
Fuji et al.

(10) Patent No.: US 12,266,854 B2
(45) Date of Patent: Apr. 1, 2025

(54) WIRELESS COMMUNICATION APPARATUS

(71) Applicants: DENSO TEN Limited, Hyogo (JP); DENSO CORPORATION, Kariya (JP)

(72) Inventors: Hiroyuki Fuji, Kobe (JP); Naoki Nakajima, Kobe (JP); Yuto Honda, Kariya (JP); Tatsuhiro Numata, Kariya (JP)

(73) Assignees: DENSO TEN Limited, Kobe (JP); DENSO CORPORATION, Kariya (JP)

( * ) Notice: Subject to any disclaimer, the term of this patent is extended or adjusted under 35 U.S.C. 154(b) by 170 days.

(21) Appl. No.: 18/133,787

(22) Filed: Apr. 12, 2023

(65) Prior Publication Data

US 2023/0402762 A1 Dec. 14, 2023

(30) Foreign Application Priority Data

Jun. 13, 2022 (JP) .................................. 2022-095210

(51) Int. Cl.
*H01Q 1/38* (2006.01)
*H01Q 3/24* (2006.01)
*H01Q 13/08* (2006.01)
*H04B 1/04* (2006.01)

(52) U.S. Cl.
CPC ........... *H01Q 13/085* (2013.01); *H01Q 3/247* (2013.01)

(58) Field of Classification Search
CPC ............ H01Q 1/38; H01Q 1/48; H01Q 13/08; H01Q 13/085; H01Q 3/24; H01Q 3/247; H04B 1/04; H04B 1/0458
See application file for complete search history.

(56) References Cited

U.S. PATENT DOCUMENTS

| | | | | |
|---|---|---|---|---|
| 4,259,670 A | * | 3/1981 | Schiavone | H01Q 5/314 343/700 MS |
| 6,069,587 A | * | 5/2000 | Lynch | H01Q 9/0407 343/702 |
| 6,292,143 B1 | * | 9/2001 | Romanofsky | H01Q 25/04 343/700 MS |
| 6,295,029 B1 | * | 9/2001 | Chen | H01Q 1/38 343/895 |
| 6,819,287 B2 | * | 11/2004 | Sullivan | H01Q 9/0421 343/702 |
| 7,928,909 B2 | * | 4/2011 | Jung | H01Q 5/378 343/846 |
| 9,497,054 B1 | * | 11/2016 | Li | H04L 25/0264 |
| 11,515,635 B2 | * | 11/2022 | Ting | H01Q 9/065 |

FOREIGN PATENT DOCUMENTS

JP 2010-021925 A 1/2010

* cited by examiner

*Primary Examiner* — Tho G Phan
(74) *Attorney, Agent, or Firm* — Oliff PLC

(57) ABSTRACT

The wireless communication apparatus includes a communicator that performs at least one of transmission of signals to an antenna and reception of the signals from the antenna through a microstrip line. The microstrip line is formed with a first stub provided on the side of the communicator and a second stub provided on the side of the antenna, which stubs have resonant characteristics.

8 Claims, 4 Drawing Sheets

WIRELESS COMMUNICATION APPARATUS

CROSS REFERENCE TO THE RELATED APPLICATION

This application claims the benefit of Japanese Patent Application No. 2022-95210, filed on Jun. 13, 2022, which is hereby incorporated by reference herein in its entirety.

BACKGROUND

Technical Field

The present invention pertains to a wireless communication apparatus.

Description of the Related Art

One type of a wireless communication apparatus is configured to switch over to a wired connection and a wireless connection for carrying out evaluation or a wireless authentication test on a microstrip line connected to an antenna from a wireless frontend circuit.

PRIOR ART DOCUMENT

Patent Document

[Patent Document 1] Japanese Patent Laid-Open Publication No. 2010-21925

SUMMARY

However, such problems arise as to increase a cost due to an increased number of working steps of carrying out a connection operation for switching over a wired connection and a wireless connection, and as to deteriorate characteristics of wireless communications of a wireless communication apparatus. Use of an element exemplified by an RF switch for switching over the wired connection and the wireless connection leads to an increased number of parts.

An aspect of the present disclosure is to switch over a wired connection and a wireless connection with a simple configuration while suppressing deterioration of characteristics of wireless communications.

One aspect of the present disclosure is exemplified by a wireless communication apparatus. The wireless communication apparatus includes a communicator that performs at least one of transmission of signals to an antenna and reception of signals from the antenna through a microstrip line. The microstrip line is formed with a first stub provided on the side of the communicator and a second stub provided on the side of the antenna, which stubs have resonant characteristics.

The wireless communication apparatus is enabled to switch over the wired connection and the wireless connection with the simple configuration while suppressing the deterioration of the characteristics of the wireless communications.

DESCRIPTION OF THE EMBODIMENTS

A wireless communication apparatus will hereinafter be described with reference to the drawings by way of one embodiment.

Comparative Example

Figure 1:
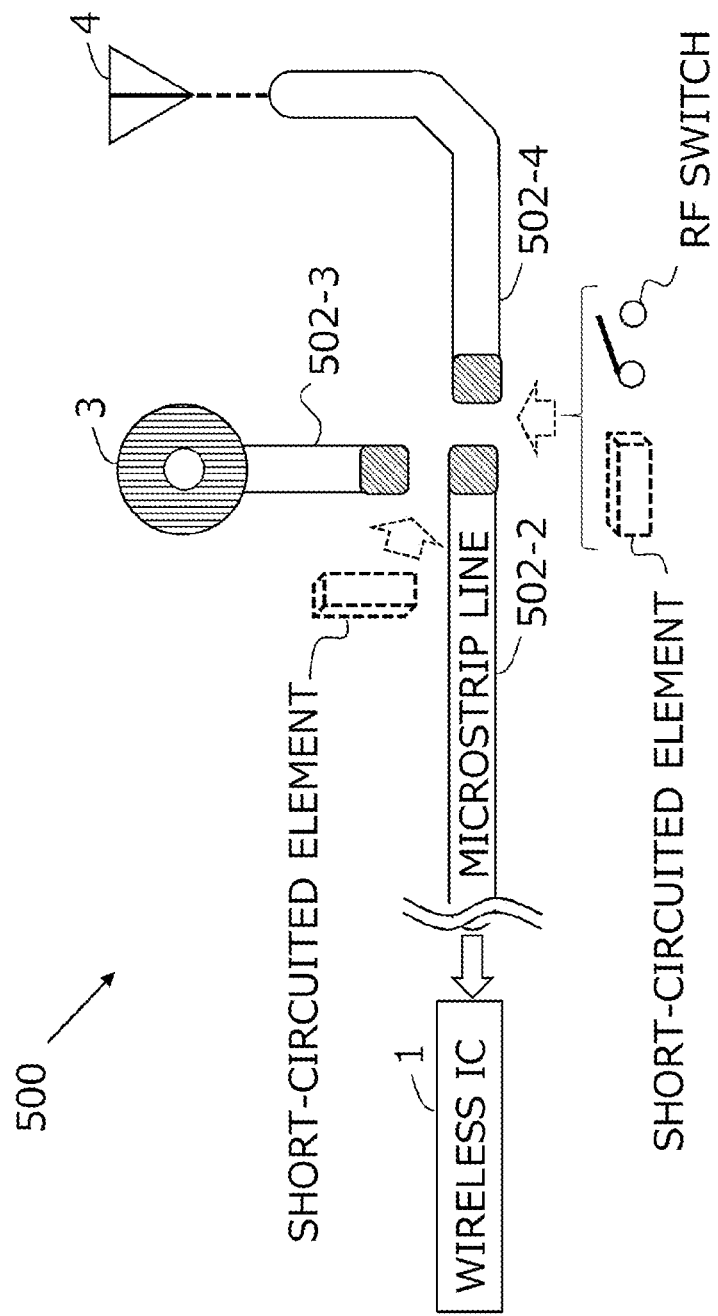
FIG. 1 is a diagram illustrating a configuration of a wireless communication apparatus according to a comparative example.

FIG. 1 is a diagram illustrating a configuration of a wireless communication apparatus 500 according to a comparative example. The wireless communication apparatus 500 includes a wireless Integrated Circuit 1 (wireless IC 1), a connector 3 for connecting a coaxial cable, an antenna 4, and a microstrip line 502 for establishing a connection between the wireless IC 1 and the connector 3 or between the wireless IC 1 and the antenna 4.

The microstrip line 502 is separated into a microstrip line 502-2 connected to the wireless IC 1, a microstrip line 502-3 connected to the connector 3, and a microstrip line 502-4 connected to the antenna 4.

As in FIG. 1, one end of the microstrip line 502-2 is connected to a transmission/reception port of the frontend circuit of the wireless IC 1. One end of the microstrip line 502-3 is connected to the connector 3. One end of the microstrip line 502-4 is connected to the antenna 4. On the other hand, the other end of the microstrip line 502-2, which is opposite to the end thereof on the side of the wireless IC 1, is connected via a short-circuit element of an RF switch to the microstrip line 502-3 or 502-4. In other words, the microstrip line 502-2 is connectible to any one of the other end, opposite to the connector 3, of the microstrip line 502-3 and the other end, opposite to the antenna 4, of the microstrip line 502-4. Impedance matching between the connector 3 and the microstrip line 502-3 is ensured by a matching circuit (unillustrated in FIG. 1). The impedance matching between the antenna 4 and the microstrip line 502-4 is ensured by the matching circuit (unillustrated in FIG. 1).

Herein, the switchover of the connection between the microstrip line 502-2 and any one of the microstrip lines 502-3 and 502-4 involves, e.g., resoldering the short-circuit element provided on the microstrip line. The switchover is enabled to be executed by installing the RF switches between the microstrip line 502-2 and the microstrip line 502-3 and between the microstrip line 502-2 and the microstrip line 502-4.

The transmission/reception port of the wireless IC 1 is connected to the antenna 4 via the microstrip line 502-2 and the microstrip line 502-4 by the methods described as such when in wireless communications. On the hand, when performing the evaluation or the wireless authentication test of the wireless communication apparatus 500, the transmission/reception port of the wireless IC 1 is connected to the connector 3 of the coaxial cable of an external device exemplified by a tester via the microstrip line 502-3 in some cases. The connection on this occasion involves resoldering or installing the RF switch.

In the case of resoldering the short-circuit element, however, a problem is a rise in cost due to an increased number of working steps. The installation of the RF switch leads to an increased number of parts. Both of the method of resoldering the short-circuit element and the method of installing the RF switch may cause an inevitable case of affecting characteristics of transmission paths between the microstrip line 502-2 and the microstrip line 502-3 and between the microstrip line 502-2 and the microstrip line 502-4. This may result in deterioration of the wireless communications of the wireless communication apparatus 500.

First Embodiment

Figure 2:
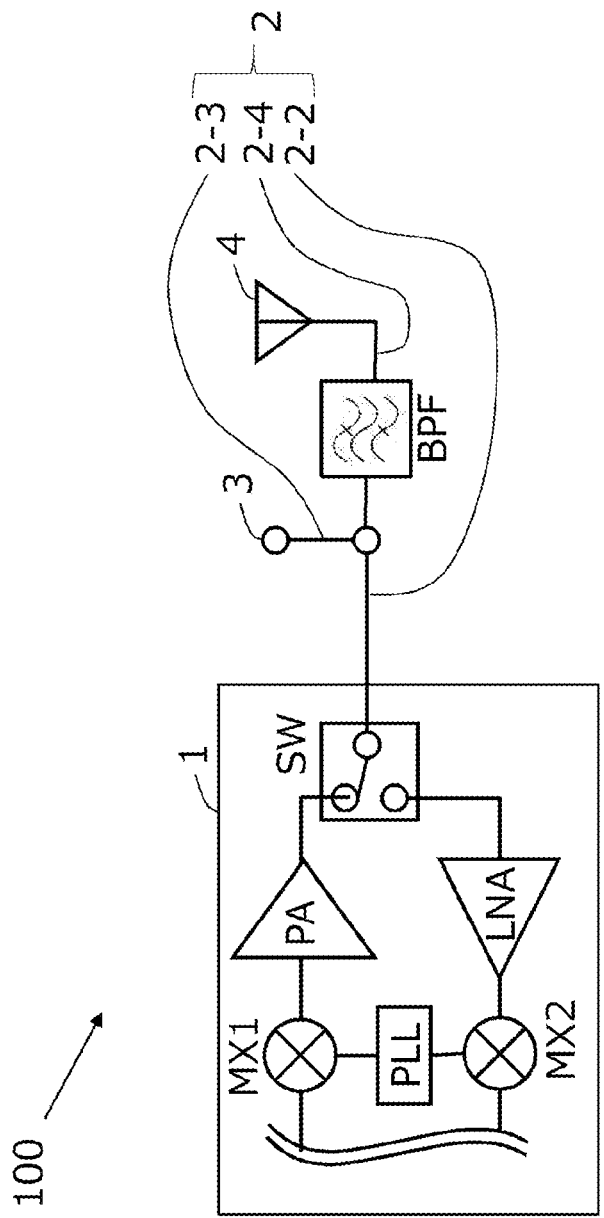
FIG. 2 is a diagram illustrating a configuration of a wireless communication apparatus according to a first embodiment.

A wireless communication apparatus 100 according to a first embodiment will hereinafter be described with reference to FIGS. 2 and 3. FIG. 2 is a diagram illustrating a configuration of the wireless communication apparatus 100 according to the first embodiment. The wireless communication apparatus 100 includes: the wireless IC 1; the connector 3 for the coaxial cable connected to the external device exemplified by the tester; the antenna 4; microstrip lines 2 to establish a connection of a path between the wireless IC 1 and the connector 3 and a connection of a path between the wireless IC 1 and the antenna 4; and a bandpass filter BPF.

The wireless IC 1 may be said to be one example of a communicator. FIG. 2 illustrates a frontend circuit of the wireless IC 1. The frontend circuit includes a modulation circuit and a demodulation circuit. The modulation circuit of the wireless IC 1 includes: a mixer MX 1 to generate a high-frequency modulation signal from a signal of a phase lock loop PLL and an input signal (baseband signal); and a power amplifier PA to amplify an output signal coming from the mixer MX 1. An output signal from the power amplifier PA is sent to the microstrip line 2 via a switch SW. The demodulation circuit of the wireless IC 1 includes: a low-noise amplifier LNA to amplify a high-frequency reception signal input via the switch SW; and a mixer MX 2 to demodulate the baseband signal on the basis of the signal of the phase lock loop PLL from the amplified reception signal. Note that the phase lock loop PLL and the switch SW operate in both of the modulation circuit and the demodulation circuit.

The microstrip line 2 branches at a branching point to the connector 3 for the coaxial cable defined as a connection cable and to the antenna 4 and thus gets connected. A microstrip line 2-2 of the microstrip lines 2 is a line for the connection between the wireless IC 1 and the branching point. A microstrip line 2-3 of the microstrip lines 2 is a line for the connection between the branching point and the connector 3. A microstrip line 2-4 of the microstrip lines 2 is a line for the connection between the branching point and the antenna 4.

As in FIG. 2, in the microstrip lines 2, the bandpass filter BPF is inserted in the microstrip line extending to the antenna 4 from the branching point to the connector 3. To be specific, the bandpass filter BPF is inserted in a mid-portion of the microstrip line 2-4.

In such a state that the coaxial cable is not connected to the connector 3, the bandpass filter BPF has characteristics of resonating at a high-frequency f generated by the wireless IC 1. During this resonation, an admittance of the bandpass filter BPF is maximized for the signal having the high-frequency f, resulting in a state of taking the impedance matching between the antenna 4 and the microstrip line 2. Accordingly, in the state of the coaxial cable staying unconnected to the connector 3, a large portion of electric power of the signals having the high-frequency f generated by the wireless IC 1 is radiated as radio signals from the antenna 4.

Whereas when the coaxial cable is connected to the connector 3, the coaxial cable affects the resonant characteristics of the bandpass filter BPF to cause a change, thereby disabling the impedance matching from being taken. In other words, the resonant characteristics fall apart. As a result, the admittance of the bandpass filter BPF decreases against the high-frequency f generated by the wireless IC 1. Therefore, the large portion of the electric power of the signals having the high-frequency f generated by the wireless IC 1 is not transmitted to the antenna 4. When the coaxial cable is thus connected to the connector 3, the wireless communication apparatus 100 is enabled to transmit the majority of the signals having the high-frequency f generated by the wireless IC 1 to the coaxial cable. In other words, the wireless communication apparatus 100 is enabled to switch over the electric power of the signals having the high-frequency f generated by the wireless IC 1 between the connector 3 and the antenna 4, depending on whether the coaxial cable is connected to the connector 3.

Figure 3:
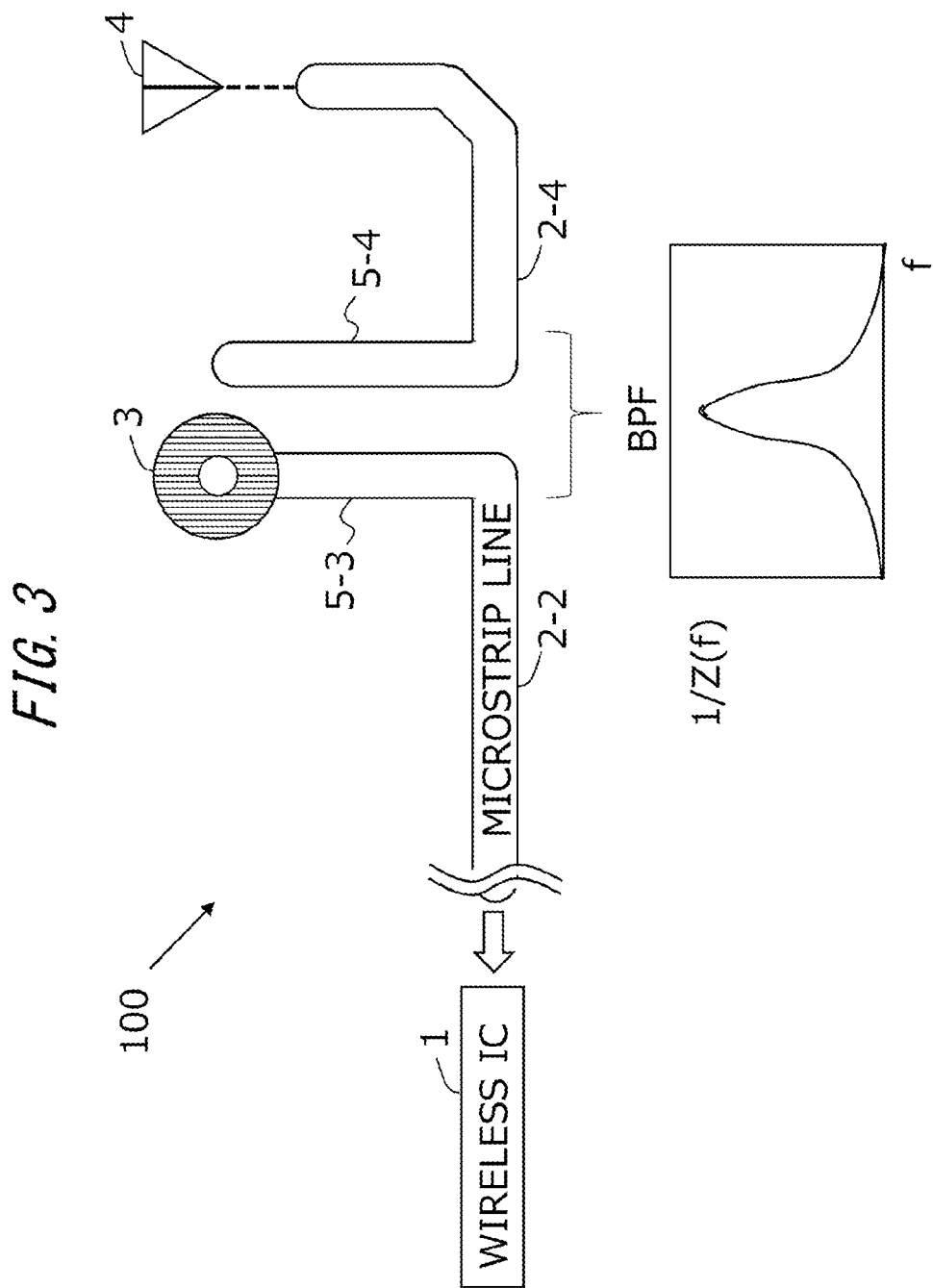
FIG. 3 is a diagram illustrating configurations of a microstrip line and a bandpass filter.

FIG. 3 is a diagram illustrating configurations of the microstrip line 2 and the bandpass filter BPF. As in FIG. 3, one end of the microstrip line 2-2 is connected to the wireless IC 1. The other end, opposite to the wireless IC 1, of the microstrip line 2-2 is formed with an open circuited stub 5-3 as a first stub. Herein, the open circuited stub 5-3 may be said to be a wiring pattern on a dielectric substrate, in which one end of the open circuited stub 5-3 is connected to the microstrip line 2-2, and the other end thereof is open. Note that the connector 3 for the coaxial cable is connected to the other end of the open circuited stub 5-3. One end of the microstrip line 2-4 is connected to the antenna 4. The other end, opposite to the antenna 4, of the microstrip line 2-4 is formed with an open circuited stub 5-4 as a second stub. Herein, the open circuited stub 5-4 may be said to be the wiring pattern on the dielectric substrate, in which one end of the open circuited stub 5-4 is connected to the microstrip line 2-4, and the other end thereof is open. In FIG. 3, a strip conductor of the microstrip line 2 is illustrated, and there are, however, omitted illustrations of the dielectric substrate and ground conductors on an underside (an opposite surface to the surface formed with the microstrip line 2) of the dielectric substrate. The microstrip lines 2-2, 2-4 and the open circuited stubs 5-3, 5-4 are all formed as the wiring patterns on the surface layer of the dielectric substrate, but part of which may also be formed on an internal layer of the dielectric substrate. In this case, the wiring pattern on the surface layer is connected by via to the wiring pattern on the internal layer. As described above, the external device exemplified by the tester is connectible to the coaxial cable. The first stub and the second stub may therefore be said to have such characteristics that the resonant state falls apart at the signal frequency upon connecting the external device to the first stub.

In the example of FIG. 3, the open circuited stub 5-3 and the open circuited stub 5-4 are formed side by side at a predetermined distance, thereby becoming a sort of coupler owing to mutually producing capacities and mutual inductances. Namely, the open circuited stub 5-3 and the open circuited stub 5-4 are not electrically connected with respect to direct current (DC) components. It is feasible to determine the admittance (and the impedance) between the microstrip line 2-2 and the microstrip line 2-4 and the frequency characteristics by adjusting lengths, widths, thicknesses and mutual distance of the open circuited stub 5-3 and the open circuited stub 5-4. According to the first embodiment, the open circuited stub 5-3 and the open circuited stub 5-4 configure the resonant circuit for the signals having the high-frequency f outputted by the wireless IC 1. Accordingly, as illustrated in FIG. 3, the open circuited stub 5-3 and the open circuited stub 5-4 become the bandpass filter BPF. The bandpass filter BPF has an admittance peak at the frequency f.

Effects of Embodiment

The wireless communication apparatus 100 includes the wireless IC 1 as the communicator performing at least one of the transmission of the signals to the antenna 4 and the reception of the signals from the antenna 4 via the microstrip line 2. The microstrip line 2 is formed with the open circuited stub 5-3 as the first stub on the side of the wireless IC 1 and the open circuited stub 5-4 as the second stub on the side of the antenna 4, which stubs have the resonant characteristics. The open circuited stub 5-3 and the open circuited stub 5-4 simply restrain fluctuations of the characteristics of the transmission path and enable control of the connection between wireless IC 1 and the antenna 4. For instance, the connection between the wireless IC 1 and the antenna 4 becomes controllable in a way that restrains the increase in the number of working steps due to soldering the short-circuit element and the increase in the number of parts due to the installation of the RF switch illustrated in the comparative example of FIG. 1.

Thus, the open circuited stub 5-3 and the open circuited stub 5-4 configure the bandpass filter BPF, and hence the bandpass filter is simply configured. The open circuited stub 5-3 is provided with the connector 3 as the connection terminal for the coaxial cable, and it is therefore feasible to change the characteristics of the bandpass filter, depending on whether the coaxial cable is connected. Accordingly, the open circuited stub 5-3 and the open circuited stub 5-4 are set in the resonant state at the high-frequency f of the radio signals in the unconnected state of the coaxial cable, whereby the impedance between the antenna 4 and the open circuited stub 5-4 may simply be matched. More specifically, it may be sufficient to simply adjust any of the dimensions, e.g., the lengths, widths, thicknesses of the respective portions of the open circuited stub 5-3 and the open circuited stub 5-4, and the space between two stubs. This adjustment enables the open circuited stub 5-3 and the open circuited stub 5-4 to be configured so that the electric power of desirable electromagnetic waves (having the high-frequency f) is transmitted to the antenna 4 from the wireless IC 1. The signals from the wireless IC 1 are thereby outputted to the antenna 4 through the open circuited stub 5-3 and the open circuited stub 5-4. The configuration made as such enables the open circuited stub 5-3 and the open circuited stub 5-4 to be uncoupled from the resonant state upon connecting the coaxial cable to the connector 3, thereby enabling reduction of supply of the transmission/reception electric power (high-frequency electric power) to the antenna 4 from the wireless IC 1. To be specific, when connecting the coaxial cable to the connector 3, the open circuited stub 5-3 extends longer by a length of the coaxial cable, and the resonant characteristics of the open circuited stub 5-3 and the open circuited stub 5-4 fall apart, thereby enabling the reduction of the supply of the transmission/reception electric power (high-frequency electric power) to the antenna 4 from the wireless IC 1. On the other hand, it is possible to match the impedances among the open circuited stub 5-3, the connector 3, the coaxial cable connected to the connector 3, the device and apparatus connected to the coaxial cable at the high-frequency f. Owing to this impedance matching, a reflection loss from the devices, the apparatuses and equivalents connected to the coaxial cable is suppressible to be minimized, for example, as small as −30 dB or under (a transmittance of the high-frequency signal is approximately 100%). Therefore, for example, in the evaluation or the wireless authentication test of the wireless communication apparatus 100, the supply destination of the high-frequency electric power from the wireless IC 1 is switched over by such a simple operation as to connect the tester to the coaxial cable, and the high-frequency electric power is thereby enabled to be supplied to the tester through the open circuited stub 5-3.

The open circuited stub 5-3 and the open circuited stub 5-4 are not electrically connected with respect to the DC components. Consequently, the DC signal components other than the high-frequency communication signals are not transmitted between the wireless IC 1 and the antenna 4, whereby transmission quality is improved.

Second Embodiment

Figure 4:
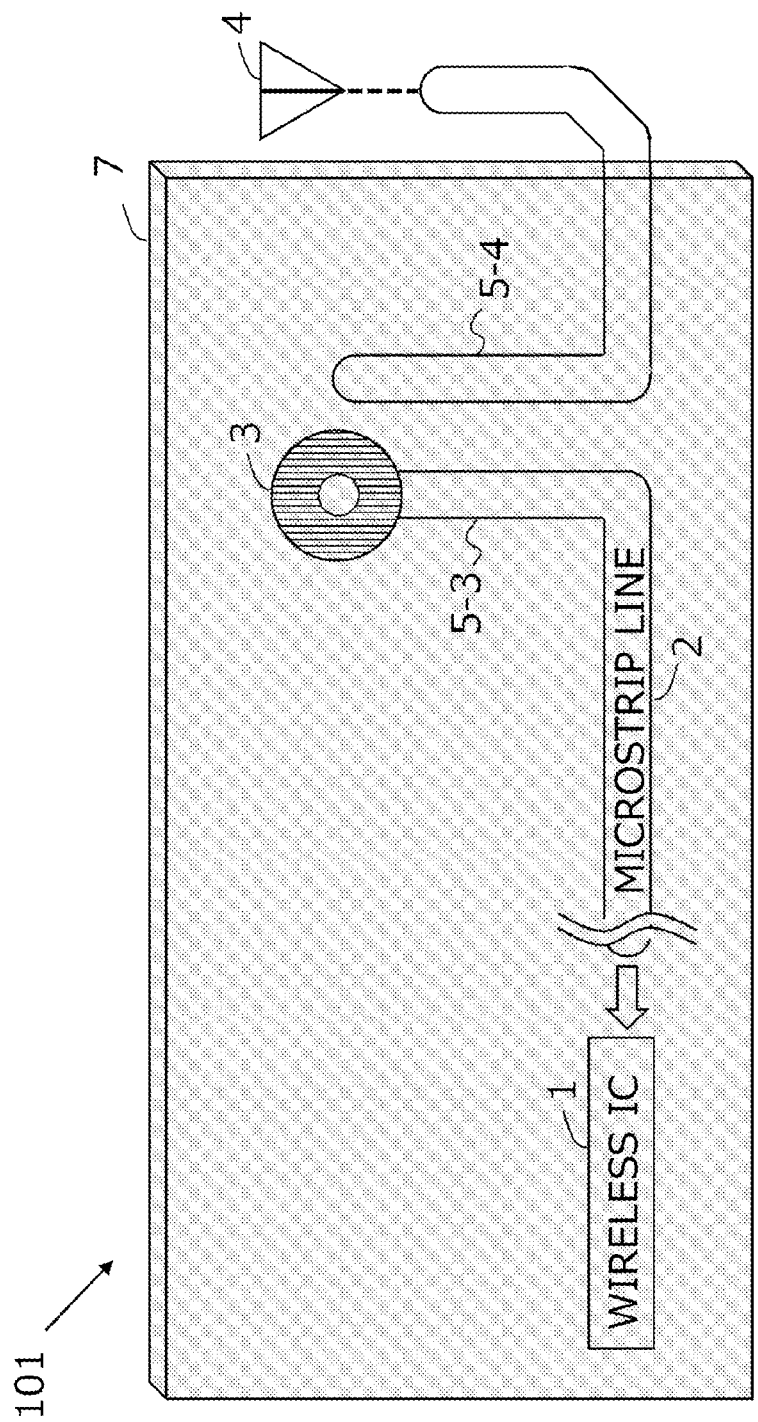
FIG. 4 is a diagram illustrating a configuration of the wireless communication apparatus according to a second embodiment.

A wireless communication apparatus 101 according to a second embodiment will hereinafter be described with reference to FIG. 4. FIG. 4 is a diagram illustrating a configuration of the wireless communication apparatus 101 according to the second embodiment. The wireless communication apparatus 101 is configured by adding a shield 7 to the wireless communication apparatus 100 of the first embodiment. Accordingly, the wireless IC 1, the microstrip line 2, the connector 3, the antenna 4 and the open circuited stubs 5-3, 5-4 in the components of the wireless communication apparatus 101 are the same in configuration as those of the wireless communication apparatus 100 according to the first embodiment.

As in FIG. 4, the shield 7 built up by an electric wave shielding material houses the wireless IC 1, the microstrip line 2, the connector 3 of the coaxial cable, the open circuited stub 5-3 and the open circuited stub 5-4 in the wireless communication apparatus 101. The shield 7 is also called a shield case. The shield 7 may also be what is called an electric wave absorber. The microstrip line 2, the connector 3 of the coaxial cable, the open circuited stub 5-3 and the open circuited stub 5-4 configure a circuit portion including the microstrip line 2 extending to the antenna 4 from the wireless IC 1 by way of a communicator. In the second embodiment, the wireless IC 1 and this circuit portion are covered with the electric wave shielding material of the shield 7.

The shield 7 is a member to surround the space by, e.g., a metal plate, a metal film, a metal mesh and equivalents. The electric wave absorber is a member to attenuate the electromagnetic waves entering the electric wave absorber by the heat loss or the resonance. The electric wave absorber is a magnetic material exemplified by a dielectric material and ferrite. The shield 7 may also be made from a magnetic shield material.

The wireless communication apparatus 101 is housed in the internal space of the shield 7, thereby enabling interference to be suppressed, which is caused by the high frequencies of the high-frequency circuit including the open circuited stubs 5-3, 5-4 having the resonance in the frequency band to be used and by the high frequencies outside the shield 7. It is also possible to suppress mutual disturbing waves between the high-frequency circuit and the exterior of the shield 7.

Other Modified Examples

In the bandpass filter BPF involves using the open circuited stub 5-3 and the open circuited stub 5-4 in the first and second embodiments. It does not, however, mean that the configurations of the wireless communication apparatuses 100, 101 are limited to the configurations using the open circuited stub 5-3 and the open circuited stub 5-4. It may be sufficient that the wireless communication apparatuses 100, 101 are configured to build up the bandpass filter BPF capable of suppressing the electric power of the radio signals to the antenna 4 in the evaluation or the wireless authentication test.

What is capable of building up the bandpass filter BPF in the microstrip line 2 may use, e.g., short-circuited stubs. For example, what the other end, on the opposite side to the connection end with the microstrip line 2, of the open circuited stub 5-4 is grounded may also be available. A coupler provided at a distance between the microstrip line 2-2 and the microstrip line 2-4 may also be employed. A coupler called a branch line coupler (hybrid coupler) branching off from the microstrip lines 2-2, 2-4 may further be used. A coupler called a Wilkinson coupler in which a resistance is provided between the microstrip lines 2-2 and 2-4 connected to both ends of the resistance, may still further be used. A filter called a parallel coupled bandpass filter may also be used, which is configured by coupling a row of conductors (arranged in parallel) into which the microstrip lines 2-2, 2-4 are each divided. A degree of freedom for building up the bandpass filter BPF in the wireless communication apparatuses 100, 101 is improved by using a variety of high-frequency components, thereby enabling the proper bandpass filter BPF to be configured.

What is claimed is:

1. A wireless communication apparatus comprising:
   an antenna;
   a microstrip line;
   a communicator to perform at least one of transmission of signals to the antenna and reception of signals from the antenna through the microstrip line;
   a first stub formed on the side of the communicator on the microstrip line; and
   a second stub formed on the side of the antenna on the microstrip line, the first and second stubs having resonant characteristics,
   the first stub being configured to be connectible to an external device, and
   wherein the resonant characteristics is a characteristics in which a resonant state occurs at a frequency of the signals when the external device is not connected to the first stub and the resonant state falls apart at the frequency of the signals when the external device is connected to the first stub.

2. The wireless communication apparatus according to claim 1, wherein the signals of the communicator are outputted to the antenna through the first stub and the second stub when the external device is not connected to the first stub, and
   the signals of the communicator are outputted to the external device through the first stub when the external device is connected to the first stub.

3. The wireless communication apparatus according to claim 1, wherein the first stub and the second stub have characteristics of a bandpass filter.

4. The wireless communication apparatus according to claim 1, wherein the first stub and the second stub are open circuited stubs.

5. The wireless communication apparatus according to claim 1, wherein the first stub is provided with a connection terminal to connect with the external device.

6. The wireless communication apparatus according to claim 5, wherein a connection cable of the external device is connected to the connection terminal, and the resonant characteristics are thereby fallen apart due to an increased length of the first stub.

7. The wireless communication apparatus according to claim 1, wherein the first stub and the second stub are not electrically connected with respect to direct current components.

8. The wireless communication apparatus according to claim 1, wherein the communicator and a circuit portion including the microstrip line extending to the antenna from the communicator are covered with a shielding material.

* * * * *